United States Patent [19]

Snyder

[11] Patent Number: 4,861,686

[45] Date of Patent: Aug. 29, 1989

[54] MULTI-CELL, VACUUM ACTIVATED DEFERRED ACTION BATTERY

[75] Inventor: Gilbert R. Snyder, Scottsdale, Ariz.

[73] Assignee: Motorola, Inc., Schaumburg, Ill.

[21] Appl. No.: 265,305

[22] Filed: Oct. 31, 1988

Related U.S. Application Data

[63] Continuation-in-part of Ser. No. 151,761, Feb. 3, 1988, abandoned.

[51] Int. Cl.⁴ .............................................. H01M 6/38
[52] U.S. Cl. ...................................... 429/90; 429/115; 429/116
[58] Field of Search ................... 429/114, 115, 116, 90

[56] References Cited

U.S. PATENT DOCUMENTS

| | | | |
|---|---|---|---|
| 2,852,592 | 9/1958 | Salauze | 429/116 |
| 2,937,220 | 5/1960 | Bauman | 429/116 |
| 2,953,111 | 9/1960 | Jones | 429/116 |
| 2,985,702 | 5/1961 | Darland et al. | 429/114 |
| 3,100,164 | 8/1963 | Solomon et al. | 429/116 |
| 3,431,147 | 3/1969 | Cleveland | 429/116 |
| 3,754,996 | 8/1973 | Snyder, II | 429/116 |
| 3,945,845 | 3/1976 | Morganstein | 429/114 |
| 4,446,211 | 5/1984 | Goebel et al. | 429/116 |
| 4,699,854 | 10/1987 | Snyder | 429/114 |

FOREIGN PATENT DOCUMENTS 0861805  3/1961  United Kingdom ................ 429/116

Primary Examiner—Donald L. Walton
Attorney, Agent, or Firm—Jordan C. Powell

[57] ABSTRACT

A multi-option, multi-cell, vacuum activated, deferred action battery which consists of a non-frangible vial which can be punctured allowing a vacuum pressure in a battery cell assembly to draw said battery fluid into said battery cells thus activating the device. This activation can occur with or without external forces such as spin or setback.

10 Claims, 3 Drawing Sheets

MULTI-CELL, VACUUM ACTIVATED DEFERRED ACTION BATTERY

This application is a continuation-in-part of prior application Ser. No. 151,761 filed Feb. 3, 1988, now abandoned.

BACKGROUND OF THE INVENTION

This invention relates to deferred action type batteries, and, in particular, to a multi-cell, vacuum activated battery.

Wet cell batteries generally tend to deteriorate once the electrolyte or other activator fluid is present within the cells. Such batteries are best preserved over extensive periods prior to use, by maintaining the cells in a sealed condition without activator fluid, which is added only shortly prior to use.

For certain military uses such as artillery shells and the like, the operation of some components is powered by primary batteries. Since operation is desired only at the moment of use, the batteries are of the deferred action type, and it is essential that the battery be activated substantially instantaneously when it is called upon for service.

Reserve type batteries are known which are activated by crushing a frangible vial containing a fluid electrolyte so that the electrolyte can come into contact with the plate elements and thus be activated and ready for service. Such batteries have been found useful in electric fuzes for rotating ordinances where the shock of setback upon firing is used to crush the vial and where the centrifugal force due to the spinning of the projectile makes possible the rapid and uniform filling of the battery cells. In the prior art, a setback force is used to fracture a sealed frangible vial containing electrolyte. Centrifugal force produced by the spinning of the projectile forces the electrolyte into the cells of the battery. Both forces are needed in this type of battery.

In U.S. Pat. No. 4,218,525 entitled "Reserve Type Battery", a spin force is not used to activate the battery, but rather, a plunger is used. The battery is activated by a gas generator moving the plunger by gas pressure or by a spring mechanism. The spring and the gas generator are actuated by setback force. The plunger crushes the frangible vial and then acts as the centrifugal force did in other batteries, forcing the released electrolyte into the battery cells.

The problem with the mentioned batteries is that a specific force is necessary for the activation of the battery. In a great many batteries, setback force and centrifugal force are both required, and in others setback force alone or a detonator is used.

In U.S. Pat. No. 4,699,854 issued to Applicant on Oct. 13, 1987 entitled "Multi-Option Deferred Action Battery", a deferred action battery having multiple methods of activation was disclosed. While this battery has multiple methods of activation, it is limited to one battery cell due to the location and structure of the cell and the speed with which the bibulous material takes up the electrolyte.

SUMMARY OF THE INVENTION

This invention pertains to a multi-option, multicell, vacuum activated deferred action battery which comprises a battery cell assembly and an ampule assembly. The battery cell assembly includes a plurality of stacked battery cells which define a fill hole therethrough. The cells of the battery are filled with a bibulous material but which does not obstruct the fill hole. A hermetically sealed container having a puncturable seal on one of its surfaces encloses the battery cells under a vacuum. The ampule assembly is coupled to the surface of the container having the puncturable seal and is a non-frangible, pliant ampule. The ampule encloses a battery fluid and a cutting means for cutting the non-frangible ampule and the puncturable seal of the container upon the application of an actuating force. The actuating force can be supplied by setback, centrifugal force or some mechanical means. The cutting of the non-frangible ampule and the puncturable seal allow the vacuum in the container to draw the battery fluid into the battery cells, thus activating the battery.

It is an object of the present invention to provide a new and improved deferred action battery.

It is a further object of the present invention to provide a new and improved multi-option, deferred action battery which is activated by a vacuum.

It is another object of the present invention to provide a multi-option, vacuum activated battery having multiple cells.

It is an object of the present invention to provide a battery which may be used to supply power to various types of military weapons.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
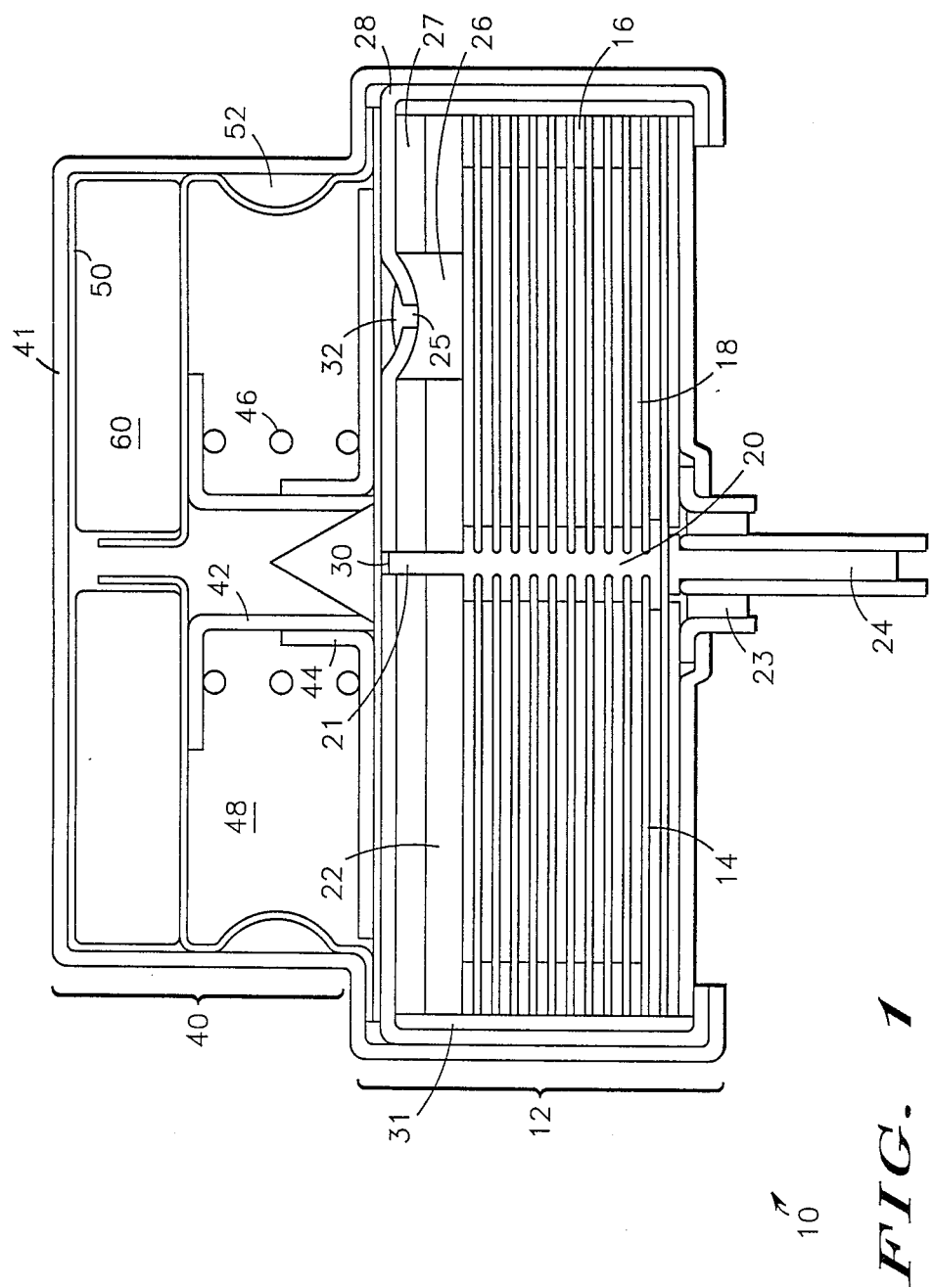
FIG. 1 is a cross-sectional side view illustrating one embodiment of the present invention.

FIG. 1 illustrates a cross-sectional side view of a first embodiment of a multi-cell vacuum activated, deferred action battery, generally designated 10. In accordance with the invention, battery 10 has a battery cell assembly 12 and an ampule assembly 40.

In battery assembly 12, a plurality of battery cells coupled in series are formed by a plurality of stacked annular bipolar plates 14 electrically isolated from each other and physically joined at the outer edges, so as to form cells therebetween, by separators 16. Plates 14 act as electrodes and in this embodiment have electrodeposited lead on one side to act as an anode, and electrodeposited lead dioxide on the opposite side acting as a cathode. When the cells are assembled, each plate will be oriented in the same direction. Thus, each cell has one surface being an anode and the opposite surface being a cathode. Also, a fill hole 20 is located in the center of each plate 14 thereby forming a passage which interconnects each of the battery cells.

Separators 16 are annular discs with a large central opening with respect to plates 14. Separators 16 have an adhesive on each side for adhering plates 14 together. In this embodiment, separators 16 are a vulcanized fiber.

A bibulous material 18 fills the cells located between plates 14, and as defined by the large central opening of separators 16, but does not obstruct fill hole 20. In this embodiment, bibulous material 18 is a bibulous paper with an opening in the center corresponding to fill hole 20. When the cells are constructed, the bibulous paper is sealed in place as each new plate 14 is attached by a separator 16.

The bottom plate, that is the last plate on one of the ends of the stacked battery cells, may not have a fill hole opening. To this bottom plate is coupled a positive terminal 24. On the top end of the battery cells, that is the end opposite terminal 24, is a support plate 22. Support plate 22 has a shape corresponding to plates 14 and has an opening corresponding to fill hole 20. In this embodiment, it also has a second opening which acts as a vacuum hole 26. Support plate 22 is coupled to the top of the stack of battery cells by one of separators 16. The stacked battery cells are then enclosed in a hermetically sealed container 28 under a vacuum. In this embodiment, the top surface of the container has an opening 21 sealed by a puncturable diaphragm 30 corresponding to fill hole 20 and a second opening 25 corresponding to vacuum hole 26. A vacuum is created in container 28 by evacuating atmosphere through vacuum hole 26. Vacuum hole 26 is then sealed by solder 32. Plates 14 are electrically isolated from container 28 by an insulating layer 31.

It should be seen by those skilled in the art that there are many methods of evacuating a container to produce a vacuum. It should be noted that a silicon rubber or other like material 27 could be placed between support plate 22 and container 28 to provide a tighter fit and to prevent heat dissipation so that vacuum hole 26 may be more easily sealed by solder. Positive terminal 24 extends through container 28 and is insulated therefrom by a glass seal 23 or the like. The negative terminal, acting as ground, is the whole container 28. The ground is coupled to the battery cells through support plate 22 which is in contact with container 28.

Ampule assembly 40 is coupled to the surface of container 28 having diaphragm 30. The coupling is accomplished in this embodiment by encasing ampule assembly 40 and battery cell assembly 12 in an outer casing 41.

In ampule assembly 40, a battery fluid 48 and a cutting means having a cutter 42, a track 44 and a resilient member 46 is enclosed in an ampule 50. Ampule 50 is a non-frangible, pliant material such as plastic, or the like and which is this embodiment is FEP TEFLON, a trademark of Dupont, because of some unique properties such as remaining pliant at temperatures as low as −40° C. Ampule 50, in this embodiment, is cylindrical with an encircling groove 52 which allows for the collapse of the ampule upon exertion of an actuacting force.

In the embodiments illustrated, an actuating force is produced from setback or spin induced centrifugal force which act as actuator means. This actuating force causes weights 60, located between outer casing 41 and ampule assembly 40, to press on ampule 50 of ampule assembly 40, compressing resilient member 46 and forcing cutting member 42 to puncture ampule 50 and diaphragm 30. It was found that in many circumstances setback force alone, without weights 60, was sufficient to activate the battery. In this case, the weight of cutting member 42 is sufficient to puncture diaphragm 30 and ampule 50. It will be known by those skilled in the art, that weights 60 and setback or spin could be replaced by an actuator such as a gas generator that is activated electronically or an electroexplosive. This would allow the battery to be used in armament, such as missiles or bombs having no setback or spin.

Cutting member 42 is a hollow piston-like shape having a bifurcated cutting edge that slidably fits into a cylindrical track 44. Track 44 holds cutting member 42 and guides same when an actuating force is applied, so that cutting member 42 will cut ampule 50 and adjacent diaphragm 30. The vacuum in battery cell assembly 12 draws battery fluid 48 from ampule assembly 40 into battery cell assembly 12 through opened diaphragm 30 collapsing ampule 50. In this embodiment, a partial vacuum of 20 inches of mercury was used. By puncturing the thin section between the ampule and battery cell assembly, fluoroboric acid fills battery cell assembly 12 about 65%. A greater percentage could be achieved with a higher vacuum. Bibulous paper 18 with its absorbant properties allows the cells to completely fill plus removes any acid from fill hole 20. This prevents any cell-to-cell parasitic current and therefore internal discharge.

Figure 4:
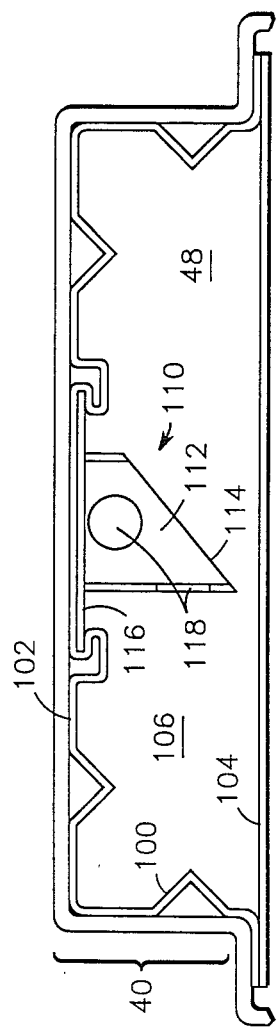
FIG. 4 is a cross-sectional side view of a second embodiment of an element of the present invention.

FIG. 4 shows another embodiment of ampule assembly 40. Ampule assembly 40 generally comprises pliant membrane 100 and cutting pin 110. Pliant membrane 100 is also a non-frangible, pliant material such as plastic or FEP TEFLON. Pliant membrane 100 includes top member 102 and bottom member 104 in the shown embodiment. When top member 102 and bottom member 104 are sealed together at the edges and incorporated into ampule assembly 40, pliant membrane 100 creates a chamber 106 in which battery fluid 48 is stored.

Cutting pin 110 comprises a hollow body 112, a cutting edge 114, and a broad plate 116. Broad plate 116 is secured to a top end of hollow body 112, and a bottom end of hollow body 112 is cut at an angle to form cutting edge 114. A plurality of apertures 118 are included in hollow body 112. When cutting pin 110 is pushed down in the direction of cutting edge 114, it cuts through bottom member 104 of pliant membrane 100 and through adjacent diaphragm 30. A residual portion or flap of bottom member 104 and diaphragm 30 will often cover the bottom of hollow body 112 keeping battery fluid 48 from flowing into battery cell assembly 12 through the bottom end of hollow body 112. However, plurality of apertures 118 allow free flow of battery fluid 48 out the sides of hollow body 112.

Broad plate 116 is securely fastened to top member 102. As a setback or spin force is applied to ampule assembly 40, cutting pin 110 is forced through bottom member 104. However, cutting pin 110 does not immediately penetrate pliant membrane 100, but moves toward bottom member 104 in a slow, dashpot fashion. As broad plate 116 is forced down, it incounters an upward force from battery fluid 48. Therefore, a continued force over time is required to force cutting pin 110 down through bottom member 104. After cutting pin 110 has pentrated pliant membrane 100 and adjacent diaphragm 30, battery fluid 48 is released and pliant membrane 100 completely collapses under the applied force. Battery fluid 48 is thus completely forced from ampule assembly 40.

Figure 2:
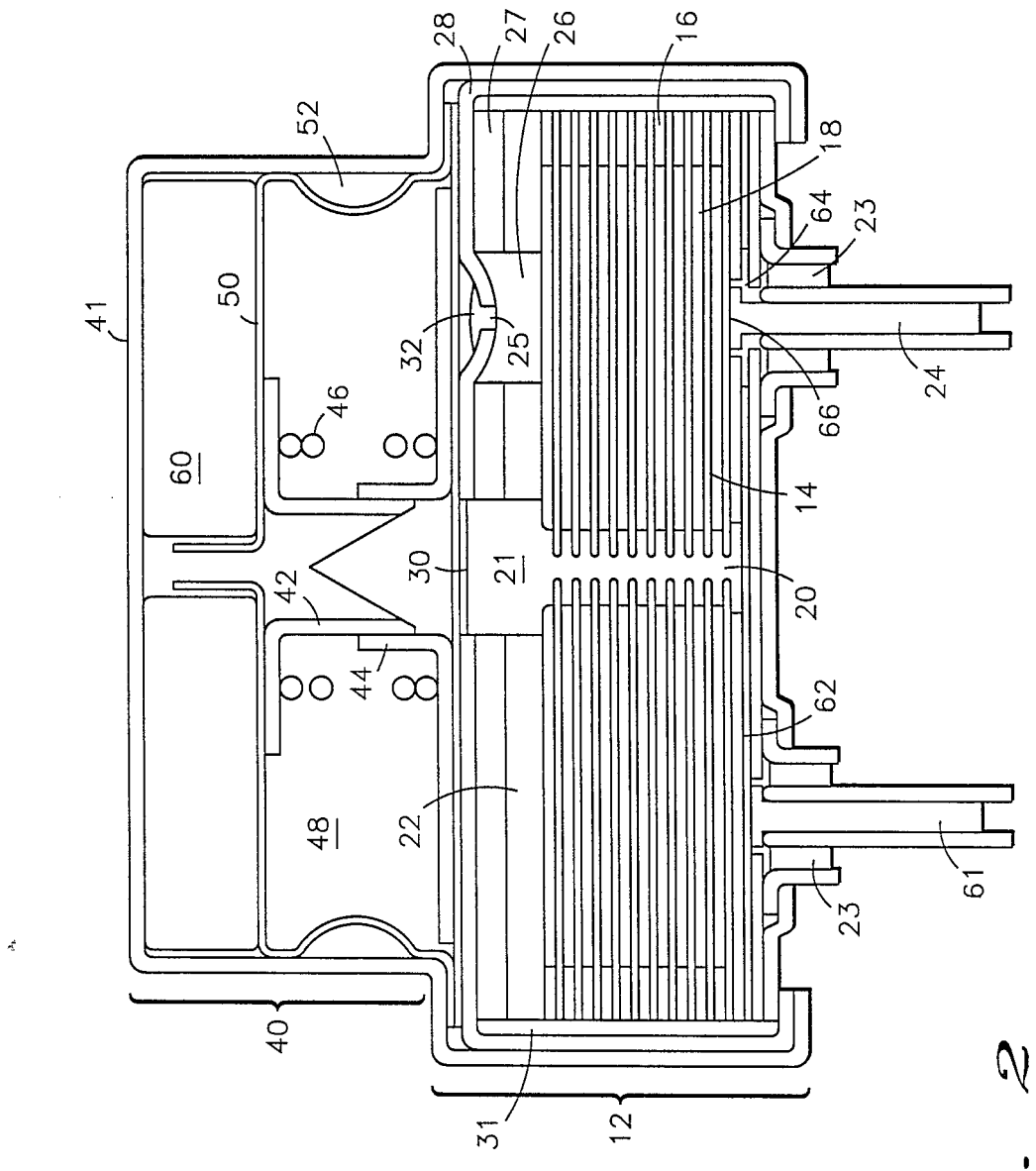
FIG. 2 is a cross-sectional side view illustrating a second embodiment of the present invention.

It is apparent that activation of this battery is dependent upon the vacuum or partial vacuum found in battery cell assembly 12. If this vacuum is reduced over a period of time due to leaks, activation of the battery will be impaired. Thus, in a second embodiment of the present invention illustrated in cross-section in FIG. 2, a vacuum terminal 61 is added. This terminal is insulated from container 28 by a glass seal or the like as was terminal 24 and is coupled to the bottom plate 62 of the battery cells. Modifications of the battery cells would include bottom plate 62 having an opening 64 through which positive terminal 24 would extend. Terminal 24 is coupled to a second plate 66 of battery cell assembly 12. Thus, the bottom plate does not contact terminal 24 and a gap is formed between terminal 24 and 61 via plates 62 and 66. Using Paschen's Law, which states that the product of voltage and spacing varies with the amount of air, the vacuum inside the battery cell assembly 12 can be determined. A voltage is applied to terminal 24 causing a charge to build up on plate 66 coupled to terminal 24. Depending upon the amount of atmosphere present, the size of the gap and the voltage applied, the charge will jump the gap between the plate 66 coupled to terminal 24 and plate 62 coupled to terminal 61. A meter can be connected to terminal 61 to register this event.

Figure 3:
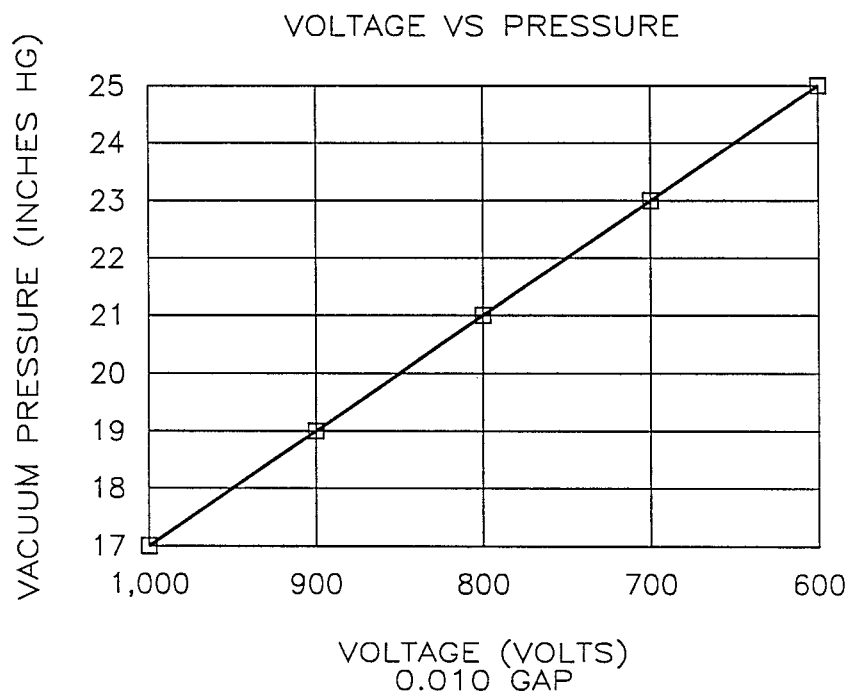
FIG. 3 is a graph illustrating Paschen's Law.

FIG. 3 is a graph illustrating a battery vacuum test with an abscissa in volts and an ordinance in inches of necessary for vacuum pressure. At high vacuum, a low voltage will jump the gap, while at low vacuum a much higher voltage is necessary. Thus, the vacuum inside battery cell assembly 12 can be determined.

There is thus provided by the present invention a new improved deferred action battery which can be activated with or without spin and/or setback forces. This battery can be activated by setback force from a fired projectile or activated by centrifugal force from a spinning projectile. It can also be activated in armament having no setback or spin such as missiles or bombs by use of a gas generator or an electroexplosive. Thus, being usable on a great variety of military weapons.

Having thus described the invention, it will be apparent to those of skill in the art that various modifications can be made within the spirit and scope of the present invention.

I claim:

1. A multi-cell, vacuum activated, deferred action battery comprising:
a battery cell assembly including a plurality of stacked battery cells defining a fill hole therethrough, a bibulous material filling said battery cells, and a hermetically sealed container having a puncturable seal on a surface thereof, a terminal insulated from said sealed container, a vacuum terminal insulated from said sealed container and electrically separated from said insulated terminal by a gap, and said container enclosing said battery cells under a partial vacuum;
an ampule assembly coupled to said surface of said container having said puncturable seal including a non-frangible, pliant ampule enclosing a battery fluid and a cutting means for puncturing said non-frangible ampule and said puncturable seal thus allowing said fluid to enter said battery cell assembly; and
an actuator means for providing an actuating force to said cutting means.

2. A battery as claimed in claim 1 wherein said battery cells include a plurality of stacked annular bipolar plates each joined to the other at the outermost portion thus leaving cells between and each electrically separated by an insulating annular separator having an adhesive on each side.

3. A battery as claimed in claim 2 wherein said annular bipolar plates have lead electrodeposited on one side and lead dioxide electrodeposited on the opposite side.

4. A battery as claimed in claim 2 wherein said insulating annular separator is a vulcanized fiber.

5. A battery as claimed in claim 1 wherein said cutting means is a cutting member slidably mounted on a track and held by a resilient member until said actuating force is applied by said actuating means.

6. A battery as claimed in claim 1 wherein said actuator means for providing an actuating force is a gas generator.

7. A battery as claimed in claim 1 wherein said actuator means for providing an actuating force is an electroexplosive.

8. A deferred action battery comprising:
plurality of electrode means for creating a direct current voltage when said plurality of electrode means are activated, each of said plurality of electrode means situated parallel and adjacent to at least one other of said plurality of electrode means;
said plurality of electrode means having a fill hole through a perpendicular axis of said plurality of electrode means;
electrolyte means for activating said plurality of electrode means, said plurality of electrode means activated when said electrolyte means is dispersed across said plurality of electrode means;
said electrolyte means dispersed to said plurality of electrode means through said fill hole;
bibulous means for completely removing said electrolyte means from said fill hole to uniformly distribute said electrolyte means across said electrode means, said bibulous means between each of a pair of said plurality of electrode means;
vacuum container means for containing said bibulous means and said plurality of electrode means in at least a partial vacuum, said vacuum container means having an aperture;
collapsible dashpot ampule means for containing said electrolyte means until said plurality of electrode means are to be activated, said collapsible dashpot ampule means coupled to said aperture;
said collapsible dashpot ampule means comprising a cutting means for penetrating said collapsible dashpot ampule means at a point where said collapsible dashpot ampule means is coupled to said aperture to allow said electrolyte means to enter into said fill hole; and
said partial vacuum acting in conjunction with said collapsible dashpot ampule means to substantially remove said electrolyte means from said collapsible dashpot ampule means.

9. A deferred action battery according to claim 8 wherein said collapsible dashpot ampule means further comprises:
pliant membrane means for containing said electrolyte means, said pliant membrane means forming an ampule;
said cutting means having a top flat surface secured to a top inner surface of said pliant membrane means;
said pliant membrane means deforming in a direction of an applied force causing said cutting means to penetrate said pliant membrane means at said point where said collapsible dashpot ampule means is coupled to said aperture.

10. A deferred action battery according to claim 8 wherein said cutting means comprises:

top surface means;
cutting edge means for cutting through said collapsible ampule means;
hollow body, said hollow body having a top end secured to said top surface means and a bottom end secured to said cutting edge means;
said hollow body including a plurality of aperture means for allowing said electrolyte to enter said fill hole from said collapsible ampule means when said cutting means has penetrated said collapsible ampule means;
said top surface means having a diameter greater than a diameter of said hollow body; and
said top surface means for creating a parachute effect to cause said collapsible ampule means to slowly deflect over time when a force is applied.

* * * * *